(12) United States Patent
Leroy et al.

(10) Patent No.: US 11,506,103 B2
(45) Date of Patent: Nov. 22, 2022

(54) MOUNTING SEAT, EXHAUST HEAT RECOVERY SYSTEM AND EXHAUST SYSTEM

(71) Applicant: Faurecia Emission Control Technologies (Shanghai) Co., Ltd., Shanghai (CN)

(72) Inventors: Florian Leroy, Yongin (KR); Young-Hwan Oh, Yongin (KR); Masaru Ohishi, Yokohama (JP)

(73) Assignee: Faurecia Emission Control Technologies (Shanghai) Co., Ltd., Shanghai (CN)

( * ) Notice: Subject to any disclaimer, the term of this patent is extended or adjusted under 35 U.S.C. 154(b) by 35 days.

(21) Appl. No.: 17/139,142

(22) Filed: Dec. 31, 2020

(65) Prior Publication Data

US 2021/0207516 A1 Jul. 8, 2021

(30) Foreign Application Priority Data

Jan. 2, 2020 (CN) .......................... 202020008009.8

(51) Int. Cl.
| | |
|---|---|
| *F01N 5/02* | (2006.01) |
| *B60K 13/04* | (2006.01) |
| *F02G 5/02* | (2006.01) |
| *F16K 31/04* | (2006.01) |
| *F01N 13/18* | (2010.01) |

(52) U.S. Cl.
CPC ................ *F01N 5/02* (2013.01); *B60K 13/04* (2013.01); *F01N 13/18* (2013.01); *F01N 13/1855* (2013.01); *F02G 5/02* (2013.01); *F16K 31/041* (2013.01); *F01N 2450/24* (2013.01); *F16K 31/04* (2013.01)

(58) Field of Classification Search
CPC ........ F01N 5/02; F01N 13/18; F01N 13/1855; F01N 2450/24; B60K 13/04; F02G 5/02; F16K 31/04; F16K 31/041
See application file for complete search history.

(56) References Cited

U.S. PATENT DOCUMENTS

| | | | |
|---|---|---|---|
| 2006/0053659 A1* | 3/2006 | Johnson | A43C 7/00 36/25 R |
| 2017/0050548 A1* | 2/2017 | Samain | B60N 2/66 |
| 2019/0120111 A1* | 4/2019 | Greber | F16K 49/005 |

* cited by examiner

*Primary Examiner* — Audrey B. Walter
(74) *Attorney, Agent, or Firm* — Quarles & Brady LLP

(57) ABSTRACT

The present disclosure relates to a mounting seat, an exhaust heat recovery system and an exhaust system. The mounting seat comprises: a lower support capable of being fixed to the base and comprising a lower fixing portion and a lower connecting portion; and an upper support provided with an upper fixing portion and an upper connecting portion, wherein the upper fixing portion and the lower fixing portion are closable through a connection between the upper connecting portion and the lower connecting portion, so as to define a fixing space, and the mounting seat fixes the actuator in the fixing space in such a way that the actuator is clamped from above and below.

14 Claims, 3 Drawing Sheets

1

MOUNTING SEAT, EXHAUST HEAT RECOVERY SYSTEM AND EXHAUST SYSTEM

CROSS-REFERENCE TO RELATED APPLICATIONS

This application claims the benefit of Chinese Patent Application No. 202020008009.8 filed Jan. 2, 2020, which is incorporated herein by reference for all purposes.

TECHNICAL FIELD

The present disclosure relates to the field of exhaust, and in particular to a mounting seat, an exhaust heat recovery system and an exhaust system.

BACKGROUND

During the operation of internal combustion engines, about 30% of energy will be discharged with heat from an exhaust tail pipe. With the increasingly strict regulations on carbon dioxide emission reduction and the market demand for fuel economy at present, exhaust heat recovery systems (EHRSs) are arranged in exhaust systems of the internal combustion engines to recover heat of exhaust gas from engines, so as to improve the fuel economy of the internal combustion engines. For hybrid power systems with internal combustion engines, the EHRS recovers waste heat from engines, and can also reduce the starting time or load of the engines in the hybrid power systems, thereby extending an endurance mileage in a pure electric mode.

As described in a public document of Chinese Patent Application No. CN 108518264 A, an exhaust heat recovery system of an exhaust system may comprise:

a heat exchanger provided with an exhaust gas circulation side, the exhaust gas circulation side being provided with an exchanger inlet connected to an exhaust gas inlet and an exchanger outlet connected to an exhaust gas outlet, wherein the heat exchanger is further provided with a heat transfer fluid circulation side, the heat transfer fluid circulation side being provided with a heat transfer fluid inlet and a heat transfer fluid outlet;

a bypass pipe defining a path of a passage configured to make exhaust gas bypass the heat exchanger to the exhaust gas outlet from the exhaust gas inlet; and a valve for regulating amounts of the exhaust gas circulating through the heat exchanger and through the bypass pipe respectively, wherein the valve is provided with a valve body, a valve member and a shaft, the exhaust gas passes through the interior of the valve body, the valve member is arranged inside the valve body and can move relative to the valve body, and the shaft is configured to drive the valve member. The shaft drives the valve member by means of the actuation of an actuator.

Hence, it is necessary to fixedly mount the actuator stably, reliably, conveniently and rapidly in the exhaust heat recovery system, so as to drive the shaft of the valve.

SUMMARY

One objective of the present disclosure is to provide a mounting seat.

Another objective of the present disclosure is to provide an exhaust heat recovery system.

Yet another objective of the present disclosure is to provide an exhaust system.

A mounting seat according to one aspect of the present disclosure is for use in an exhaust heat recovery system comprising a base and an actuator. The mounting seat comprises: a lower support capable of being fixed to the base and comprising a lower fixing portion and a lower connecting portion; and an upper support provided with an upper fixing portion and an upper connecting portion, wherein the upper fixing portion and the lower fixing portion are closable through a connection between the upper connecting portion and the lower connecting portion, so as to define a fixing space, and the mounting seat fixes the actuator in the fixing space in such a way that the actuator is clamped from above and below.

In one or more embodiments of the mounting seat, the lower support comprises a groove portion, and a first lower extension portion and a second lower extension portion which extend from two side walls of the groove portion respectively, the lower connecting portion comprises a first lower connecting portion and a second lower connecting portion, which are located at the first lower extension portion and the second lower extension portion respectively, a bottom surface of the groove portion is capable of being fixed to the base, and a wall surface of the groove portion comprises the lower fixing portion.

In one or more embodiments of the mounting seat, the upper support comprises a first upper extension portion and a second upper extension portion, which extend from two sides of the upper fixing portion respectively, the upper connecting portion comprises a first upper connecting portion and a second upper connecting portion, which are located at the first upper extension portion and the second upper extension portion respectively, and the upper fixing portion and the lower fixing portion are closable through a connection between the first upper connecting portion and the first lower connecting portion and a connection between the second upper connecting portion and the second lower connecting portion.

In one or more embodiments of the mounting seat, the upper fixing portion and the lower fixing portion are provided with an upper cambered section and a lower cambered section respectively, which are configured to fix the actuator in up and down directions of an outer wall surface of the actuator respectively.

In one or more embodiments of the mounting seat, the first upper connecting portion and the first lower connecting portion are connected to form a rotation structure, and the upper support is rotatable with the first upper connecting portion as an axis, so as to close or open the upper fixing portion and the lower fixing portion.

In one or more embodiments of the mounting seat, the second upper connecting portion and the second lower connecting portion are connected via threaded connection structures respectively.

In one or more embodiments of the mounting seat, the exhaust heat recovery system further comprises a torsion spring configured to transmit actuation output by the actuator; and the lower support further comprises a stop portion, which extends from the bottom surface of the groove portion, which forms a hooked connection structure with one end of the torsion spring, and which stops and is connected to the one end of the torsion spring.

An exhaust heat recovery system according to another aspect of the present disclosure comprises a tank body, an actuator and any one of the mounting seats as described above, wherein the tank body comprises the base, the bottom of the lower support is fixed to the base, and the actuator is mounted on the mounting seat.

In one or more embodiments of the exhaust heat recovery system, the recovery system further comprises a torsion spring configured to transmit actuation output by the actuator, one end of the torsion spring being connected to the lower support of the mounting seat; and the tank body comprises a cooling fluid tank comprising the base, and the actuator, the torsion spring and the mounting seat are arranged in a mounting space defined by the cooling fluid tank.

An exhaust system according to yet another aspect of the present disclosure is for use with an internal combustion engine and comprises any one of the exhaust heat recovery systems as described above.

The present disclosure may include, but is not limited to, the progressive effects that through the design of the upper fixing portion and the lower fixing portion, the mounting seat clamps the actuator from above and below, and what is needed in the mounting operation process is only to close the upper fixing portion and the lower fixing portion, without the need for complicated mounting and positioning operations. Moreover, a vertical clamping structure reduces the requirements for the machining error precision of the mounting seat, allows the mounting seat and the actuator to have certain machining errors and reduces machining costs. The exhaust heat recovery system and the exhaust system have the advantages of reliable operation and compact structure.

BRIEF DESCRIPTION OF THE DRAWINGS

The above-mentioned and other features, properties and advantages of the present disclosure will become more apparent from the following description in conjunction with the accompanying drawings and the embodiments. It is to be noted that the accompanying drawings are merely examples, which are not drawn to scale, and should not be construed as limiting the scope of protection actually claimed by the present disclosure. in the accompanying drawings:

DETAILED DESCRIPTION

Various different implementations or embodiments carrying out the subject matter and technical solutions are disclosed as follows. Specific examples of various elements and arrangements are described below for the purpose of simplifying the disclosure, and of course, these are merely examples and are not intended to limit the scope of protection of the present disclosure.

In addition, the expressions "first", "second", etc. are used to limit components and parts only for the purpose of facilitating distinction between corresponding components and parts, and unless otherwise stated, the above expressions have no special meaning and therefore cannot be interpreted as limiting the scope of protection of the present disclosure. The expressions "one embodiment", "an embodiment" and/or "some embodiments" are intended to mean a certain feature, structure, or characteristic associated with at least one embodiment of the present application. Hence, it should be emphasized and noted that "an embodiment" or "one embodiment" or "one or more embodiments" mentioned in two or more different positions in this specification does not necessarily refer to the same embodiment. Furthermore, some of the features, structures, or characteristics of one or more embodiments of the present application can be combined as appropriate.

Figure 1:
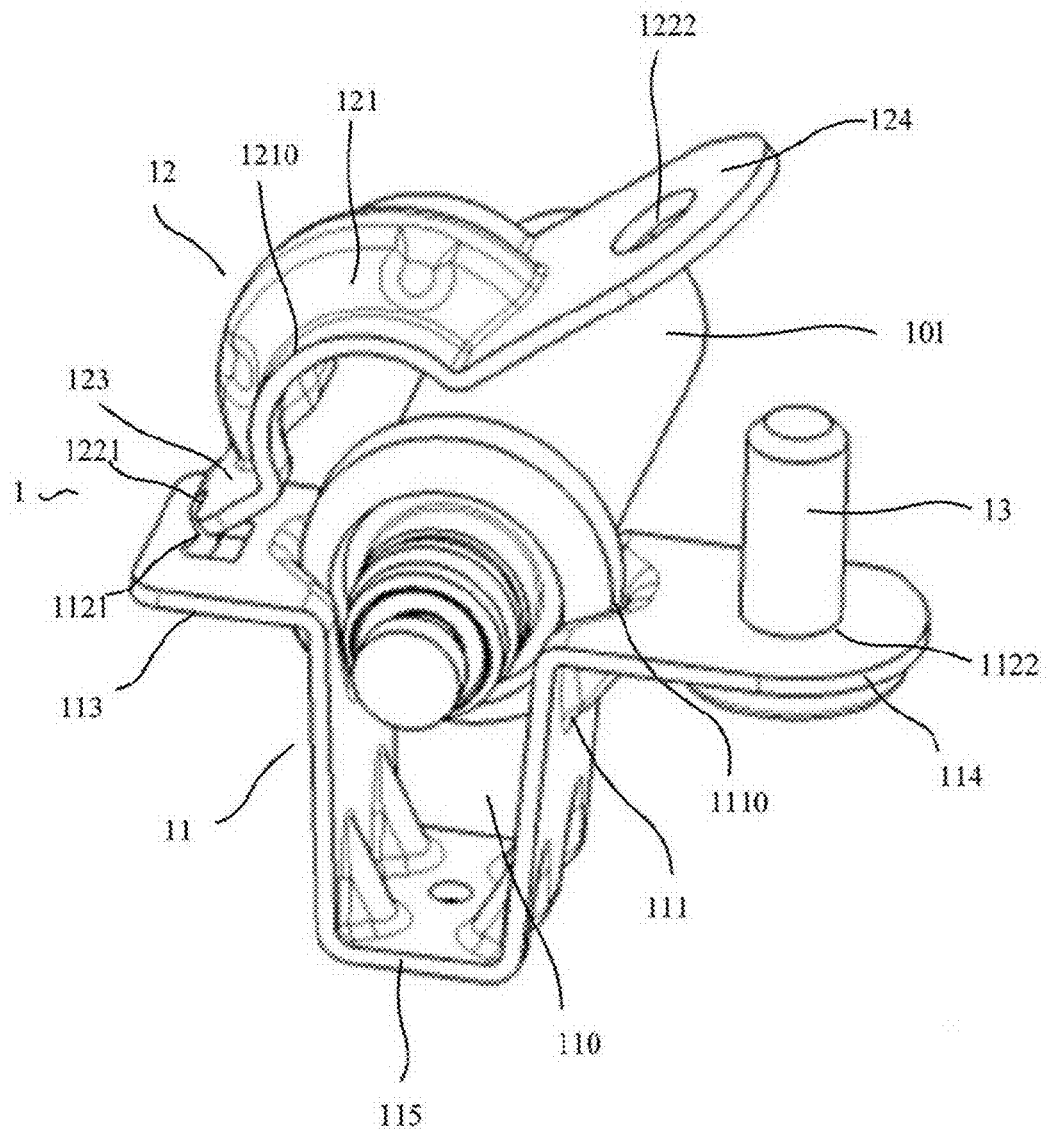
FIG. 1 is a structural schematic diagram of a mounting seat according to one or more embodiments.
Figure 2:
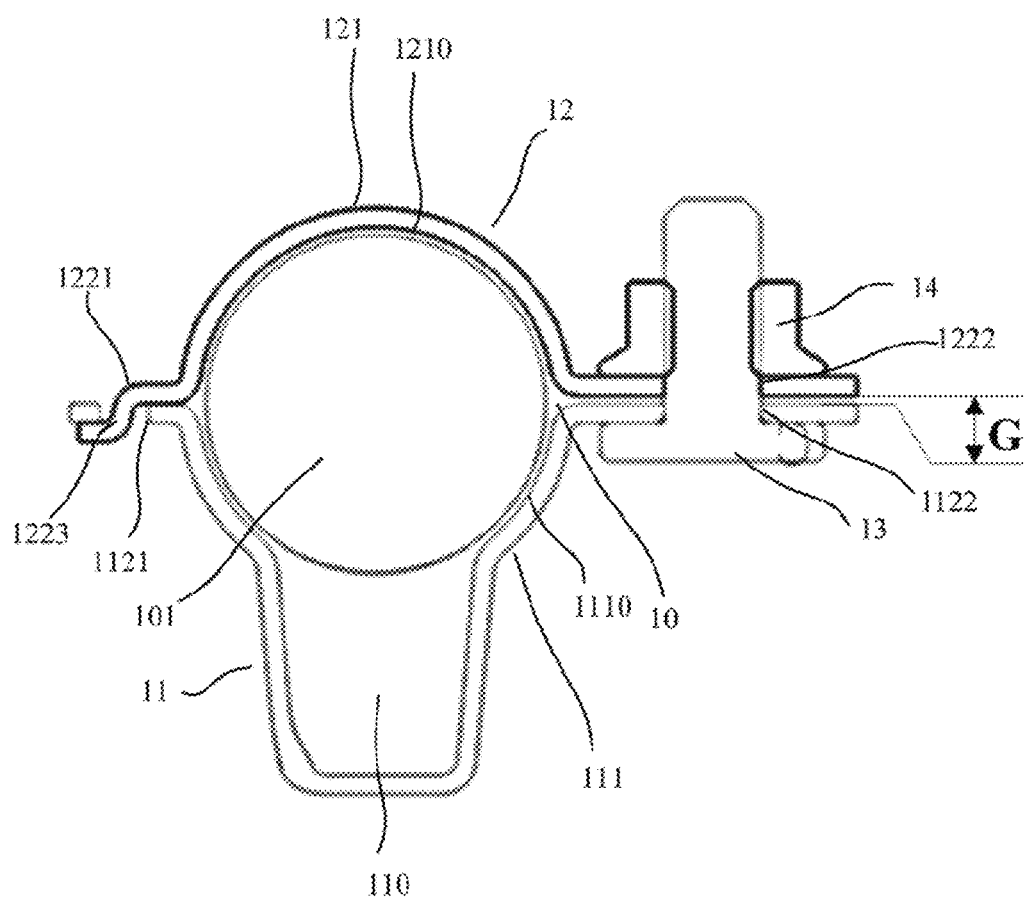
FIG. 2 is a structural schematic diagram of the mounting seat and an actuator in an assembled state according to one or more embodiments.
Figure 3:
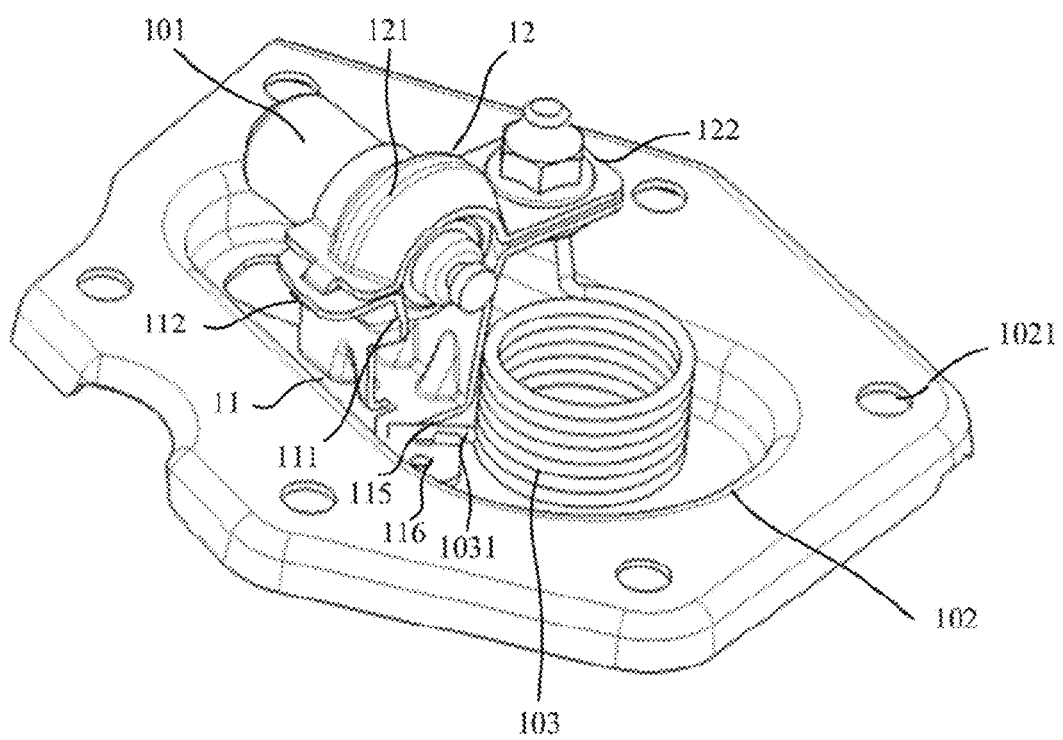
FIG. 3 is a structural schematic diagram of the mounting seat, the actuator and a base in an assembled state according to one or more embodiments.

With reference to FIGS. 1-3, in an embodiment, as shown in FIG. 2, an exhaust heat recovery system of an exhaust system comprises an actuator 101 and a base 102. A mounting seat 1 is fixed to the base 102, so as to mount and fix the actuator 101. The mounting seat 1 comprises a lower support 11 and an upper support 12. As shown in FIG. 1, the lower support 11 is fixed to the base 102. The lower support 11 comprises a lower fixing portion 111 and a lower connecting portion 112, and the upper support 12 comprises an upper fixing portion 121 and an upper connecting portion 122. As shown in FIGS. 1 and 3, the upper fixing portion 121 and the lower fixing portion 111 are closed through a connection between the upper connecting portion 122 and the lower connecting portion 112, so as to define a fixing space 10, and the mounting seat 1 clamps the actuator 101 from above and below to fix same in the fixing space 10 by means of the upper fixing portion 121 and the lower connecting portion 111, so as to mount and fix the actuator 101. The beneficial effects of such an arrangement lie in that the mounting seat is configured to be a mounting and fixing structure capable of performing clamping from above and below, so as to make it easy to operate in the mounting process of the actuator 101, what is needed is that the lower support 11 is fixed to the base 102 first, which, for example, may be fixed by means of a welding structure, the mounting position of the actuator 101 on the base 102 is determined first, the actuator 101 is then placed on the lower fixing portion 111, and the upper fixing portion 121 and the lower fixing portion 111 are closed, without the need for complicated mounting and positioning operations. Moreover, a vertical clamping structure reduces the requirements for the machining error precision of the mounting seat, allows the mounting seat and the actuator to have certain machining errors and reduces machining costs.

With continued reference to FIGS. 1-3, in an embodiment, a specific structure of the lower support 11 may be as follows: the lower support 11 comprises a groove portion 110, and a first lower extension portion 113 and a second lower extension portion 114 which extend from two side walls of the groove portion 110 respectively, the lower connecting portion 112 comprises a first lower connecting portion 1121 and a second lower connecting portion 1122, which are located at the first lower extension portion 113 and the second lower extension portion 114 respectively, a bottom surface 115 of the groove portion 110 is capable of being fixedly welded to the base 102, and a wall surface of the groove portion 110 comprises the lower fixing portion 111. The beneficial effect of such an arrangement lies in that the lower support 11 can support the actuator 101 more firmly and reliably, so as to operate the actuator reliably.

With continued reference to FIGS. 1-3, in one or more embodiments, a specific structure of the upper support 12 may be as follows: the upper support 12 comprises a first upper extension portion 123 and a second upper extension portion 124, which extend from two sides of the upper fixing portion 121 respectively, the upper connecting portion 122 comprises a first upper connecting portion 1221 and a second upper connecting portion 1222, which are located at the first upper extension portion 123 and the second upper extension portion 124 respectively, and the upper fixing portion 121 and the lower fixing portion 122 are closed through a connection between the first upper connecting portion 1221 and the first lower connecting portion 1121 and a connection between the second upper connecting portion 1222 and the second lower connecting portion 1122. In this way, the mounting and closing processes of the upper support 11 and the lower support 12 can also be conveniently perform, and the mounting process may specifically involve: firstly, fixedly welding the lower support 11 to the base 102, and determining the mounting position of the actuator 101 in the exhaust heat recovery system; and then placing the actuator 101 on the lower fixing portion 111 of the lower support 11, connecting the first upper connecting portion 1221 of the upper support 12 to the first lower connecting portion 1121 of the lower support 11, and connecting the second upper connecting portion 1222 of the upper support 12 to the second lower connecting portion 1122 of the lower support 11, so as to close the upper fixing space 121 of the upper support 12 and the lower fixing space 111 of the lower support to fix the actuator 101.

With continued reference to FIGS. 1-3, in some embodiments, a connection form between the connecting portions may be as follows: the first upper connecting portion 1221 and the first lower connecting portion 1121 are connected to form a rotation structure, and the upper support 12 may rotate with the first upper connecting portion 1221 as an axis, such that the upper fixing portion 121 and the lower fixing portion 111 form a closed state as shown in FIGS. 2 and 3 or an opened state as shown in FIG. 1. A specific form of the rotation structure may be as shown in FIG. 2, in which the first upper connecting portion 1221 is connected to the first lower connecting portion 1121 via a hooked connection structure 1223, or other structures such as a pin and a hinge may be used, but what is needed is that the hooked connection structure 1223 is simple and does not need other connectors, such that the mounting seat has a simple structure, and is easy to mount, and convenient to disassemble and maintain.

With continued reference to FIGS. 1-3, in some embodiments, the second upper connecting portion 1222 and the second lower connecting portion 1122 may be connected via threaded connection structures, that is, the threaded connection structures constituted by a bolt 13 and a nut 14 as shown in FIGS. 1-3. The bolt 13 may be pre-welded to the second lower connecting portion 1122, and the nut 14 may be located on the second upper connecting portion 1222 to compress the second upper connecting portion 1222. The beneficial effects of such an arrangement lie in that after the upper support 12 rotates about the rotation structure and is closed with the lower support 11, a gap G is provided between the second upper connecting portion 1222 and the second lower connecting portion 1122, and the gap G can be eliminated through the compression of the nut 14, such that the upper support and the lower support are closed more firmly, the situation that mounting and fixing of the mounting seat 1 are loosened due to the actuation of the actuator 101 is prevented, and the actuator operates reliably.

With continued reference to FIGS. 1-3, in some embodiments, specific forms of the upper fixing portion 121 and the lower fixing portion 111 may be as follows: the upper fixing portion 121 and the lower fixing 111 are provided with an upper cambered section 1210 and a lower cambered section 1110 respectively, so as to better match the shape of the actuator 101 through such an arrangement, and therefore, the fixing portion fixes the actuator 101 more firmly.

With reference to FIG. 1, in one or more embodiments, the exhaust heat recovery system may further comprise a torsion spring 103 configured to transmit actuation output by the actuator 101. The lower support 11 may further comprise a stop portion 116. The stop portion 116 extends from the bottom surface 115 of the groove portion 110, and stops and is connected to one end 1031 of the torsion spring 103, and a specific form for forming the stop structure may be a hooked connection structure. The beneficial effects of such an arrangement lie in that the torsion spring 103 can be compactly connected to the mounting seat 1 and the actuator 101, which saves on the mounting space in the system, and is conducive to miniaturization of the system.

With reference to FIG. 3, in an embodiment, a tank body of the exhaust heat recovery system comprises the base 102, it can be understood by a person skilled in the art that particularly, a cooling fluid tank may be provided, which contains a cooling fluid of the exhaust system, the cooling fluid tank comprises the base 102, and the actuator 101, the torsion spring 103 and the mounting seat 1 are arranged in the mounting space defined by the cooling fluid tank, so as to make the arrangement of the system compact. Particularly, the mounting space of the cooling fluid tank may be formed by connecting a cover body to connecting holes 1021 of the base 102 in a closed manner, and the actuator 101 is in sufficient contact with the cooling fluid in the mounting space and is maintained at a suitable temperature. The specific structure of the cooling fluid tank may refer to a public document of Chinese Patent Application No. CN 108518264 A, and since the present disclosure is mainly to describe the specific structure and functions of the mounting seat 1, specific details of the cooling fluid tank will not be described in detail herein.

It can be seen from the above that by using the mounting seat, the exhaust heat recovery system and the exhaust system described in the above embodiments, the beneficial effects lie in that through the design of the upper fixing portion and the lower fixing portion, the mounting seat clamps the actuator from above and below, and what is needed in the mounting operation process is only to close the upper fixing portion and the lower fixing portion, without the need for complicated mounting and positioning operations. Moreover, a vertical clamping structure reduces the requirements for the machining error precision of the mounting seat, allows the mounting seat and the actuator to have certain machining errors and reduces machining costs. The exhaust heat recovery system and the exhaust system have the advantages of reliable operation and compact structure.

Although the present disclosure has been disclosed as the above embodiments which, however, are not intended to limit the present disclosure, any person skilled in the art could make possible changes and alterations without departing from the spirit and scope of the present disclosure. Hence, any alteration, equivalent change and modification which are made to the above-mentioned embodiments in accordance with the technical essence of the present disclosure without departing from the contents of the technical solutions of the present disclosure would all fall within the scope of protection defined by the claims of the present disclosure.

REFERENCE NUMERALS

101—Actuator
102—Base
103—Torsion spring
1—Mounting seat
11—Lower support
110—Groove portion
111—Lower fixing portion
1110—Lower cambered section 112—Lower connecting portion
1121—First lower connecting portion
1122—Second lower connecting portion
113—First lower extension portion
114—Second lower extension portion
115—Bottom surface of groove portion
116—Stop portion
12—Upper support
121—Upper fixing portion
1210—Upper cambered section
122—Upper connecting portion
1221—First upper connecting portion
1222—Second upper connecting portion
1223—Hooked connection structure
123—First upper extension portion
124—Second upper extension portion
13—Bolt
14—Nut

We claim:

1. An exhaust heat recovery system, comprising a tank body having a base, an actuator, and a mounting seat, wherein the mounting seat comprises:
 a lower support capable of being fixed to the base and comprising a lower fixing portion and a lower connecting portion; and
 an upper support provided with an upper fixing portion and an upper connecting portion,
 wherein the upper fixing portion and the lower fixing portion are closable through a connection between the upper connecting portion and the lower connecting portion, so as to define a fixing space, and the mounting seat fixes the actuator in the fixing space in such a way that the actuator is clamped from above and below;
 wherein the bottom of the lower support is fixed to the base, and the actuator is mounted on the mounting seat.

2. The exhaust heat recovery system of claim 1, wherein the recovery system further comprises a torsion spring configured to transmit actuation output by the actuator, one end of the torsion spring being connected to the lower support of the mounting seat; and the tank body comprises a cooling fluid tank comprising the base, and the actuator, the torsion spring and the mounting seat are arranged in a mounting space defined by the cooling fluid tank.

3. The exhaust heat recovery system of claim 1, wherein the lower support comprises a groove portion, and a first lower extension portion and a second lower extension portion which extend from two side walls of the groove portion respectively, the lower connecting portion comprises a first lower connecting portion and a second lower connecting portion, which are located at the first lower extension portion and the second lower extension portion respectively, a bottom surface of the groove portion is capable of being fixed to the base, and a wall surface of the groove portion comprises the lower fixing portion.

4. The exhaust heat recovery system of claim 3, wherein the exhaust heat recovery system further comprises a torsion spring configured to transmit actuation output by the actuator; and the lower support further comprises a stop portion, which extends from the bottom surface of the groove portion, which forms a hooked connection structure with one end of the torsion spring, and which stops and is connected to the one end of the torsion spring.

5. The exhaust heat recovery system of claim 3, wherein the upper support comprises a first upper extension portion and a second upper extension portion, which extend from two sides of the upper fixing portion respectively, the upper connecting portion comprises a first upper connecting portion and a second upper connecting portion, which are located at the first upper extension portion and the second upper extension portion respectively, and the upper fixing portion and the lower fixing portion are closable through a connection between the first upper connecting portion and the first lower connecting portion and a connection between the second upper connecting portion and the second lower connecting portion.

6. The exhaust heat recovery system of claim 5, wherein the upper fixing portion and the lower fixing portion are provided with an upper cambered section and a lower cambered section respectively, which are configured to fix the actuator in up and down directions of an outer wall surface of the actuator respectively.

7. The exhaust heat recovery system of claim 5, wherein the first upper connecting portion and the first lower connecting portion are connected to form a rotation structure, and the upper support is rotatable with the first upper connecting portion as an axis, so as to close or open the upper fixing portion and the lower fixing portion.

8. The exhaust heat recovery system of claim 7, wherein the second upper connecting portion and the second lower connecting portion are connected via threaded connection structures respectively.

9. An exhaust system for use with an internal combustion engine, the exhaust system comprising an exhaust heat recovery system, wherein the exhaust heat recovery system comprises a tank body having a base, an actuator, and a mounting seat, wherein the mounting seat comprises:
 a lower support capable of being fixed to the base and comprising a lower fixing portion and a lower connecting portion; and
 an upper support provided with an upper fixing portion and an upper connecting portion,
 wherein the upper fixing portion and the lower fixing portion are closable through a connection between the upper connecting portion and the lower connecting portion, so as to define a fixing space, and the mounting seat fixes the actuator in the fixing space in such a way that the actuator is clamped from above and below;
 wherein the bottom of the lower support is fixed to the base, and the actuator is mounted on the mounting seat.

10. The exhaust system of claim 9, wherein the recovery system further comprises a torsion spring configured to transmit actuation output by the actuator, one end of the torsion spring being connected to the lower support of the mounting seat; and the tank body comprises a cooling fluid tank comprising the base, and the actuator, the torsion spring and the mounting seat are arranged in a mounting space defined by the cooling fluid tank.

11. A mounting seat for use in an exhaust heat recovery system comprising a base and an actuator, the mounting seat comprising:
 a lower support capable of being fixed to the base and comprising a lower fixing portion and a lower connecting portion; and
 an upper support provided with an upper fixing portion and an upper connecting portion,
 wherein the upper fixing portion and the lower fixing portion are closable through a connection between the upper connecting portion and the lower connecting portion, so as to define a fixing space, and the mounting seat fixes the actuator in the fixing space in such a way that the actuator is clamped from above and below;
 wherein the lower support comprises a groove portion, and a first lower extension portion and a second lower extension portion which extend from two side walls of the groove portion respectively, the lower connecting portion comprises a first lower connecting portion and a second lower connecting portion, which are located at the first lower extension portion and the second lower extension portion respectively, a bottom surface of the groove portion is capable of being fixed to the base, and a wall surface of the groove portion comprises the lower fixing portion;

wherein the upper support comprises a first upper extension portion and a second upper extension portion, which extend from two sides of the upper fixing portion respectively, the upper connecting portion comprises a first upper connecting portion and a second upper connecting portion, which are located at the first upper extension portion and the second upper extension portion respectively, and the upper fixing portion and the lower fixing portion are closable through a connection between the first upper connecting portion and the first lower connecting portion and a connection between the second upper connecting portion and the second lower connecting portion;

wherein the first upper connecting portion and the first lower connecting portion are connected to form a rotation structure, and the upper support is rotatable with the first upper connecting portion as an axis, so as to close or open the upper fixing portion and the lower fixing portion.

12. The mounting seat of claim 11, wherein the upper fixing portion and the lower fixing portion are provided with an upper cambered section and a lower cambered section respectively, which are configured to fix the actuator in up and down directions of an outer wall surface of the actuator respectively.

13. The mounting seat of claim 11, wherein the second upper connecting portion and the second lower connecting portion are connected via threaded connection structures respectively.

14. The mounting seat of claim 11, wherein the exhaust heat recovery system further comprises a torsion spring configured to transmit actuation output by the actuator; and the lower support further comprises a stop portion, which extends from the bottom surface of the groove portion, which forms a hooked connection structure with one end of the torsion spring, and which stops and is connected to the one end of the torsion spring.

* * * * *